(12) United States Patent
Hirooka et al.

(10) Patent No.: US 8,931,364 B2
(45) Date of Patent: Jan. 13, 2015

(54) STEERING DEVICE

(71) Applicant: Yamada Manufacturing Co., Ltd., Kiryu-shi, Gunma-ken (JP)

(72) Inventors: Kouji Hirooka, Gunma (JP); Suguru Sugishita, Gunma (JP)

(73) Assignee: Yamada Manufacturing Co., Ltd., Isesaki-Shi, Gunma (JP)

( * ) Notice: Subject to any disclaimer, the term of this patent is extended or adjusted under 35 U.S.C. 154(b) by 91 days.

(21) Appl. No.: 13/720,895

(22) Filed: Dec. 19, 2012

(65) Prior Publication Data

US 2013/0160598 A1 Jun. 27, 2013

(30) Foreign Application Priority Data

Dec. 22, 2011 (JP) ................. 2011-282183

(51) Int. Cl.
*B62D 1/18* (2006.01)
*B62D 1/184* (2006.01)

(52) U.S. Cl.
CPC ..................... *B62D 1/184* (2013.01)
USPC ............ 74/493; 280/775; 280/776; 280/777; 280/779

(58) Field of Classification Search
USPC ..................... 74/493; 280/775, 776, 777, 779
See application file for complete search history.

(56) References Cited

U.S. PATENT DOCUMENTS

| | | | |
|---|---|---|---|
| 5,338,064 A * | 8/1994 | Sadakata et al. ............... 280/775 |
| 5,743,150 A * | 4/1998 | Fevre et al. ..................... 74/493 |
| 6,092,957 A * | 7/2000 | Fevre et al. ................... 403/373 |
| 6,450,531 B1 * | 9/2002 | Rinker et al. ................. 280/775 |
| 7,219,926 B2 * | 5/2007 | Ikeda et al. ................... 280/775 |
| 7,735,391 B2 * | 6/2010 | Osawa et al. ................... 74/493 |
| 8,522,639 B2 * | 9/2013 | Hirooka et al. ................ 74/493 |
| 8,578,812 B2 * | 11/2013 | Minamigata .................... 74/492 |
| 8,596,161 B2 * | 12/2013 | Maniwa et al. ................. 74/493 |
| 2005/0104353 A1 * | 5/2005 | Ikeda et al. ................... 280/775 |
| 2006/0151984 A1 * | 7/2006 | Higashino et al. ............ 280/775 |
| 2006/0214410 A1 * | 9/2006 | Sawada et al. ................ 280/775 |
| 2006/0243084 A1 | 11/2006 | Osawa et al. |
| 2011/0036198 A1 * | 2/2011 | Minamigata .................... 74/493 |

FOREIGN PATENT DOCUMENTS

| JP | 62-019483 Y2 | 5/1987 |
| JP | 2006-298072 A | 11/2006 |

* cited by examiner

*Primary Examiner* — Toan To
(74) *Attorney, Agent, or Firm* — McGinn IP Law Group, PLLC

(57) ABSTRACT

A steering device includes a fixed bracket, a movable bracket, a friction plate, a first friction washer, a pressing plate, engagement units, a second friction washer, and a fastening tool. The friction plate is attached to face, with an appropriate gap, at least one of both fixed side portions of the fixed bracket. The first washer is inserted between the fixed side portion and the friction plate. The pressing plate is attached to an outer surface of the friction plate. The engagement unit causes the pressing plate to be detachably attached and be immovable at least in a vertical direction. The second friction washer is clamped between the pressing plate and the friction plate. The fixed bracket, the friction plate, the first friction washer, the second friction washer, and the pressing plate are connected by penetrating therethrough a lock bolt of the fastening tool.

6 Claims, 5 Drawing Sheets

VIEW ALONG ARROW Y1-Y1

STEERING DEVICE

BACKGROUND OF THE INVENTION

1. Field of the Invention

The present invention relates to a steering device which in particular is, when implementing tilt and telescopic adjustment, capable of strengthening a locked state thereof and allowing a tilt and telescopic adjustment operation in an unlocked state to be performed smoothly.

2. Description of the Related Art

In the related art, in order to increase the force of retaining the position of a steering wheel to the position after tilt adjustment, a structure in which a pressure-contact frictional force caused by an axial force of a lock bolt is increased by superimposing a plurality of friction members is employed. Structures of this type are disclosed in Japanese Examined Utility Model Application Publication No. S62-19483 and Japanese Unexamined Patent Application Publication No. 2006-298072. Japanese Examined Utility Model Application Publication No. S62-19483 and Japanese Unexamined Patent Application Publication No. 2006-298072 will be described briefly. In the following description, reference numerals attached to members are the same as those described in Japanese Examined Utility Model Application Publication No. S62-19483 and Japanese Unexamined Patent Application Publication No. 2006-298072.

Japanese Examined Utility Model Application Publication No. S62-19483 discloses a structure in which a plurality of plate members 27 is welded to a plurality of spacers 29 clamped between the plate members 27 to form double-disc clutches 23 and 25 (see FIG. 4 of Japanese Examined Utility Model Application Publication No. S62-19483). Japanese Unexamined Patent Application Publication No. 2006-298072 discloses a structure in which a friction plate 5 is fixed to a fixed side portion 1 of a fixed bracket A with an appropriate gap, and a friction washer 6 is inserted between the fixed side portion 1 and the friction plate 5. In this structure, a washer 15 is disposed on an outer surface 5a2 of the friction plate 5, and the friction plate 5 is clamped between the friction washer 6 and the washer 15 to thereby strengthen the force of fastening the friction plate 5.

SUMMARY OF THE INVENTION

According to the structure disclosed in Japanese Examined Utility Model Application Publication No. S62-19483, it is necessary to weld the plurality of plate members 27 and the spacers 29 in an appropriately superimposed state in order to form the double-disc clutches 23 and 25. Thus, a manufacturing process is complex, and it is difficult to reduce the cost.

The force required for retaining a tilt adjustment position is different depending on a mounted vehicle body. In Japanese Unexamined Patent Application Publication No. 2006-298072, although the force of retaining a tilt position is increased by increasing the diameter of the friction washer, since the range where the diameter can be increased is limited by a layout or the like, the retaining force that can be increased is also limited. An object (technical problem to be solved by) of the present invention is to realize a locked state that is sufficiently strong in a normal fastening torque with a very simple structure and to stabilize the position after tilt adjustment.

As a result of intensive studies to solve the above problems, the present inventor solved the problems by providing, as a first aspect of a present invention, a steering device including: a fixed bracket that includes fixed side portions on both sides in a width direction of the fixed bracket; a movable bracket disposed between the fixed side portions; a friction plate attached to face, with an appropriate gap, at least one of both fixed side portions of the fixed bracket; a first friction washer inserted between the fixed side portions and the friction plate; a pressing plate attached to an outer surface of the friction plate; engagement means for detachably attaching the pressing plate to the friction plate so as to be immovable at least in a vertical direction; a second friction washer clamped between the pressing plate and the friction plate; and a fastening tool, wherein the fixed bracket, the friction plate, the first friction washer, the second friction washer, and the pressing plate are connected by penetrating therethrough a lock bolt of the fastening tool so as to be freely locked and unlocked.

A second aspect of the invention solves the problems by the steering device according to the first aspect of the invention, in which the engagement means includes a projection-shaped engaging portion and a notch-shaped engaged portion to which the engaging portion is inserted. A third aspect of the invention solves the problems by the steering device according to the second aspect of the invention, in which the engaging portion is formed on both sides in a front-rear direction of the pressing plate, and the engaged portion is formed on both sides in the front-rear direction of the friction plate.

A fourth aspect of the invention solves the problems by the steering device according to the second aspect of the invention, in which the engaging portion is formed on both sides in a front-rear direction of the friction plate, and the engaged portion is formed on both sides in the front-rear direction of the pressing plate. A fifth aspect of the invention solves the problems by the steering device according to any one of the second, third, and fourth aspect of the inventions, in which the engaging portion on the front side has a vertical dimension that is different from that of the engaging portion on the rear side, and the engaged portions have sizes that correspond to those of the engaging portions on the front and rear sides.

In the first aspect of the invention, the steering device having a tilt mechanism includes: a friction plate attached to face at least one of both fixed side portions of a fixed bracket with an appropriate gap; a first friction washer inserted between the fixed side portion and the friction plate; a pressing plate that is detachably attached to an outer surface of the friction plate by engagement means so as to be immovable at least in a vertical direction; and a second friction washer clamped between the pressing plate and the friction plate.

In such a multi-clamping state that the first friction washer is inserted between the fixed bracket and the friction plate, and the second friction washer is inserted between the friction plate and the pressing plate, these members are fastened by the lock bolt. Thus, a pressure-contact frictional force caused by the axial force of the lock bolt is effectively increased. As a result, it is possible to increase the force of retaining a tilt position.

Moreover, the friction plate and the pressing plate are attached by the engaging portion and the engaged portion so that the pressing plate is immovable at least in the vertical direction and the circumferential direction. Due to this, the pressing plate is fixed to the fixed bracket together with the friction plate in the vertical direction and the circumferential direction. Even when a strong force is applied in the vertical direction of the steering column, it is possible to reliably retain the tilt position while preventing the steering column from deviating in the vertical direction.

Further, the force of retaining the tilt position in the locked state can be increased remarkably just by adding the pressing plate. There is no need to change an assembling order significantly and change or process the shapes of other components significantly, which leads to a cost reduction. Furthermore, since the pressing plate and the friction plate are independent members, when the locked state created by the lock bolt is released to perform tilt adjustment, the engagement state in the axial direction between the engaging portion and the engaged portion is loosened. Thus, a gap is formed between the friction plate, the pressing plate, the first friction washer, and the second friction washer, and these members are not pressed against each other. As a result, users can perform the tilt and telescopic adjustment operation smoothly.

In the second aspect of the invention, the engagement means is configured to include the projection-shaped engaging portion and the notch-shaped engaged portion. Thus, an engagement structure for attaching the friction plate and the pressing plate so as to be immovable in the vertical direction is realized in a simplest manner. Further, by moving the pressing plate to be separated from the friction plate along the axial direction of the lock bolt, the engaging portion and the engaged portion can be disengaged easily.

Moreover, the separation of the pressing plate from the friction plate can be easily realized by loosening the fastening tool. In the third aspect of the invention, the engaging portion is formed on both sides in the front-rear direction of the pressing plate, and the engaged portion is formed on both sides in the front-rear direction of the friction plate. Due to this configuration, there is no need to change or process the shapes of components significantly, and the force of retaining the tilt position can be increased without increasing the cost.

In the fourth aspect of the invention, the engaging portion is formed on both sides in the front-rear direction of the friction plate, and the engaged portion is formed on both sides in the front-rear direction of the pressing plate. Due to this configuration, the projection-shaped engaging portion does not interfere with the fixed side portion of the fixed bracket to which the friction plate is attached, and the projection-shaped engaging portion can be formed so as to protrude a relatively long distance toward the outside. Thus, when the steering device is assembled and is moved for the next process, the friction plate and the pressing plate can maintain the engagement state realized by the engagement means.

In the fifth aspect of the invention, the engaging portion on the front side has a vertical dimension that is different from that of the engaging portion on the rear side, and the engaged portions have sizes that correspond to those of the engaging portions on the front and rear sides. Due to this configuration, the engaging portion on the front side can be reliably attached to the engaging portion on the rear side. As a result, the front-rear direction of the pressing plate can be made identical to the front-rear direction of the steering device, and possible errors during the assembling operation can be prevented.

DESCRIPTION OF THE PREFERRED EMBODIMENTS

Hereinafter, embodiments of the present invention will be described with reference to the drawings. First, as shown in FIG. 1, the present invention mainly includes a fixed bracket 1, a movable bracket 2, a friction plate 3, a pressing plate 4, engagement means 5, a first friction washer 61, a second friction washer 62, a fastening tool 7, and the like.

Figure 1A:
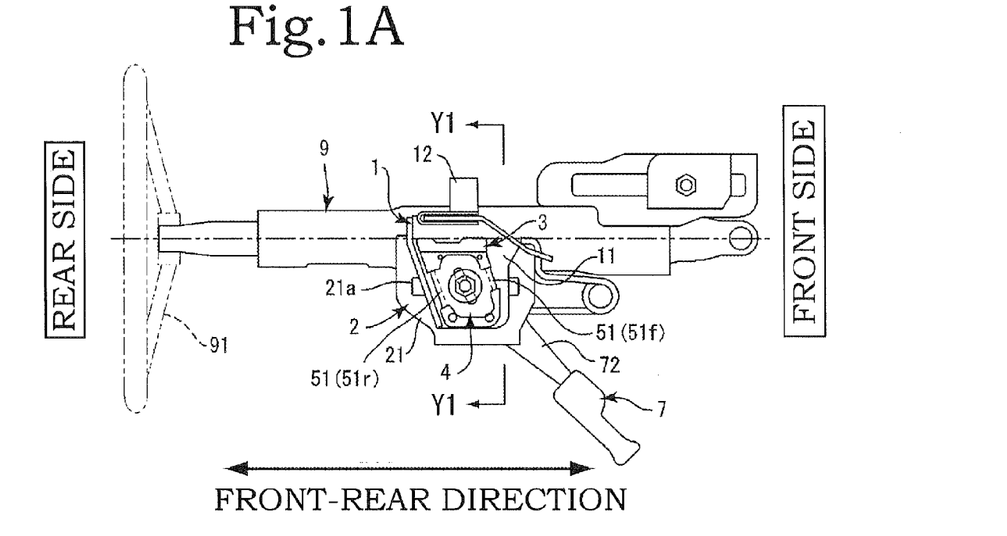
FIG. 1A is a schematic side view of a steering device according to a first embodiment of the present invention.

A front-rear direction used in the description of the present invention means a front-rear direction of a steering device, a front side means a front wheel side (not shown), and a rear side means a side of a steering column 9 on which a steering wheel 91 is attached (see FIG. 1A). The front and rear sides are the same direction as the front-rear direction of the steering device in a state where the constituent members of the present invention are assembled.

Figures 1B, 1C:
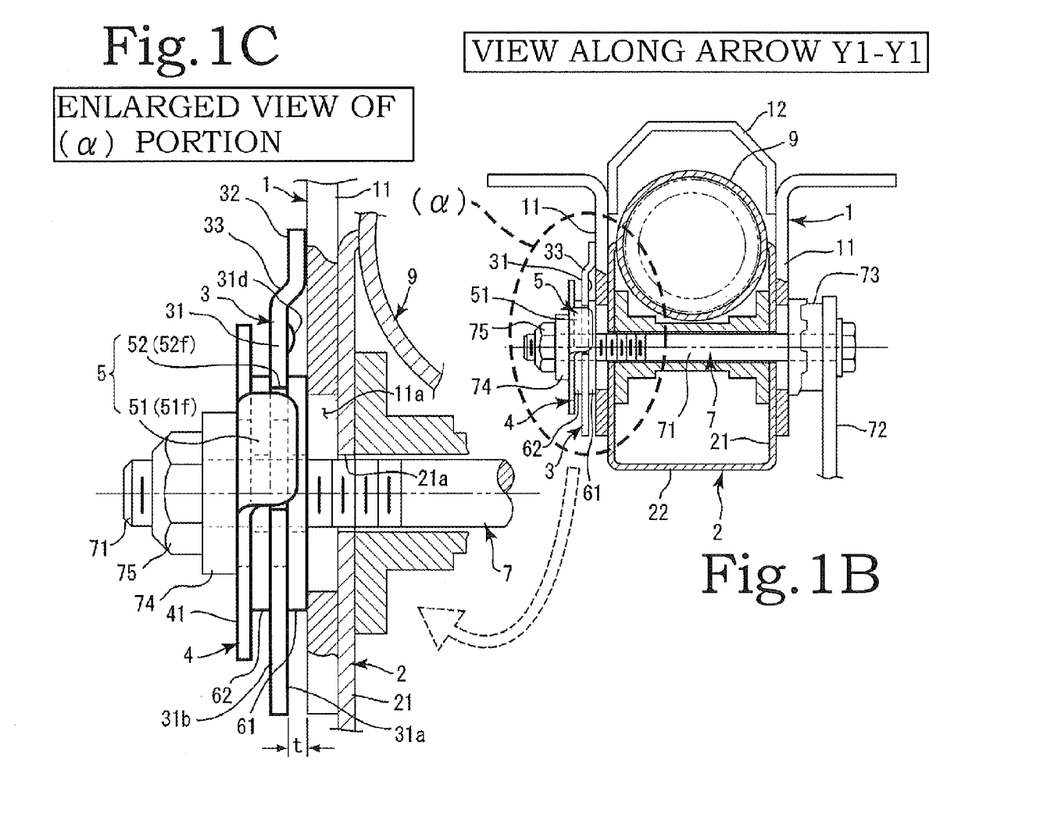
FIG. 1B is a cross-sectional view along arrows Y1-Y1 in FIG. 1A.
FIG. 1C is an enlarged view of a portion indicated by α in FIG. 1B.

The fixed bracket 1 includes fixed side portions 11 that face in the width direction and an attachment head 12 (see FIG. 1B). The fixed side portions 11 are formed approximately as a piece of a board, and the attachment head 12 is attached to the upper ends of the fixed side portions 11. Further, long tilt-adjustment holes 11a are formed in both fixed side portions 11. The long tilt-adjustment hole 11a is formed in such a form that the hole obliquely extends in the vertical direction. Further, the long tilt-adjustment hole 11a has a gently circular arc shape in the longitudinal direction thereof as necessary. The long tilt-adjustment hole 11a performs tilt adjustment together with the movable bracket 2.

Movable side portions 21 are formed on both sides of the movable bracket 2 in the width direction (see FIG. 1B). A movable bottom portion 22 that integrally connects both movable side portions 21 is formed under both movable side portions 21. The steering column 9 is welded and fixed to the upper ends of both movable side portions 21 in a clamped state, and both movable side portions 21 are attached between both fixed side portions 11 of the fixed bracket 1 in a clamped state. Long telescopic-adjustment holes 21a are formed in both movable side portions 21 of the movable bracket 2 in order to perform telescopic adjustment (see FIG. 10).

The long telescopic-adjustment holes 21a are linear through holes that are formed along the longitudinal direction of the steering column 9 attached to the movable bracket 2. The long tilt-adjustment holes 11a of the fixed bracket 1 and the long telescopic-adjustment holes 21a of the movable bracket 2 are aligned with each other, a lock bolt 71 of the fastening tool 7 is inserted into the holes, and an operating lever portion 72 and a cam member 73 are attached to the lock bolt 71 (see FIG. 1B).

When the operating lever portion 72 is rotated, the fixed bracket 1 and the movable bracket 2 are locked (fastened) or unlocked (unfastened) during tilt and telescopic adjustment. More specifically, the cam member 73 includes two cams, and one cam rotates and the other cam remains stationary. The two cams move closer to or away from each other with the rotation of the operating lever portion 72, whereby the lock and unlocked states are realized.

Figure 2A:
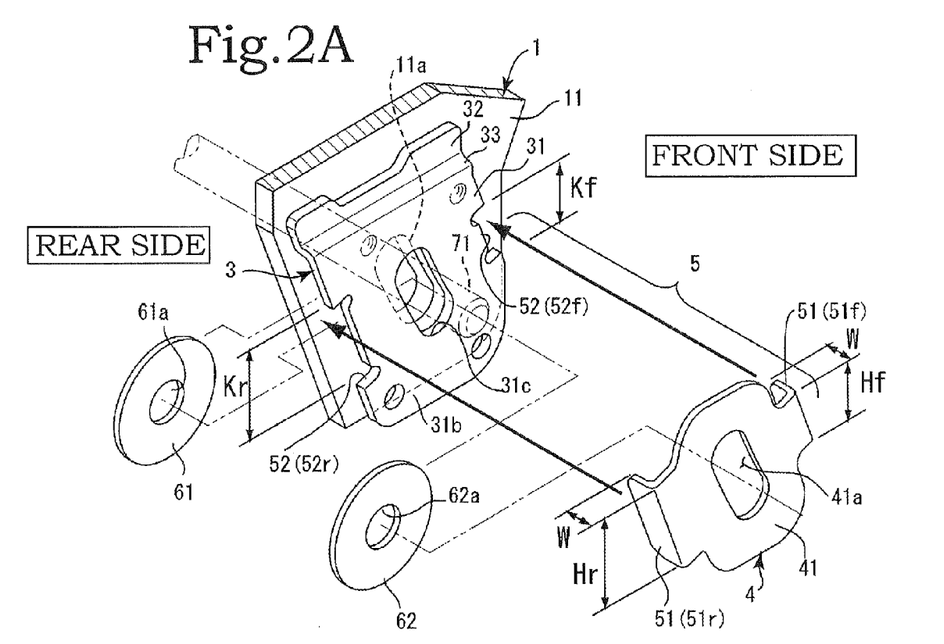
FIG. 2A is a perspective view showing a state where a friction plate, a pressing plate, a first friction washer, and a second friction washer according to the first embodiment of the present invention are separated.
Figure 2B:
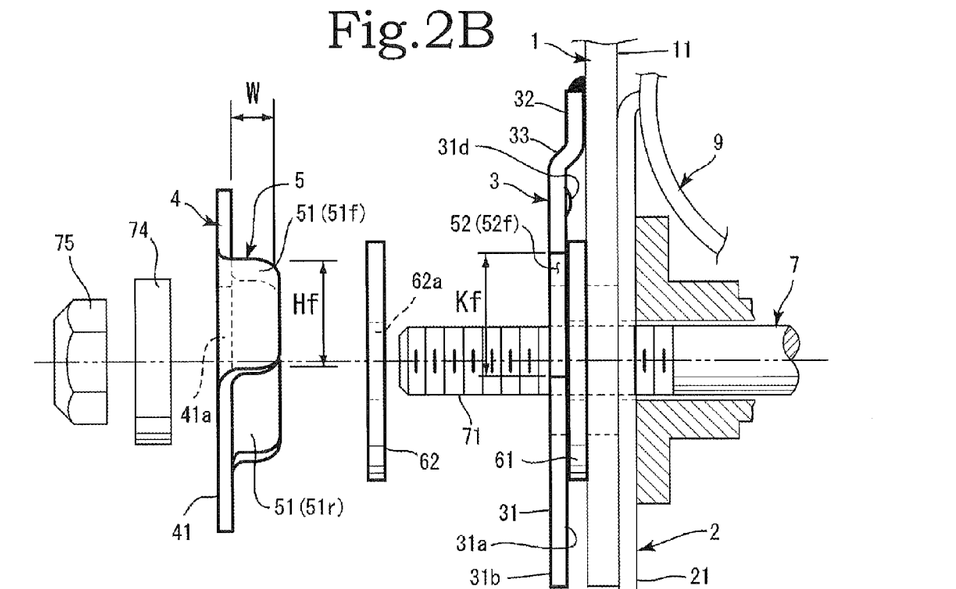
FIG. 2B is a partially cross-sectional front view of a main part showing a state where the pressing plate and the friction washer are separated from a fixed side portion of a fixed bracket.

As shown in FIG. 1 and FIG. 2, the friction plate 3 is attached to at least one of both fixed side portions 11 of the fixed bracket 1 so as to face the fixed side portion 11 with an appropriate gap. The friction plate 3 is made from metal and includes a planar portion 31, an attachment portion 32, and a separation portion 33. The planar portion 31 has a flat plate shape and is formed in an approximately rectangular shape following the shape of the fixed side portion 11.

The planar portion 31 of the friction plate 3 includes an inner surface 31a and an outer surface 31b. Here, the inner surface 31a means a surface that faces the fixed side portion 11 in a state where the friction plate 3 is attached to the fixed side portion 11 of the fixed bracket 1. Moreover, the outer surface 31b means a surface that is on the opposite side of the inner surface 31a.

A long tilt-adjustment hole 31c having the same shape as the long tilt-adjustment holes 11a formed in the fixed side portions 11 is formed in the planar portion 31. Moreover, the friction plate 3 is fixed to the fixed side portions 11 using fixing means such as welding in a state where the positions of the long tilt-adjustment holes 11a of the fixed side portions 11 are identical to the position of the long tilt-adjustment hole 31c of the planar portion 31.

The attachment portion 32 is formed in an upper end portion of the planar portion 31. Moreover, the separation portion 33 is formed between the planar portion 31 and the attachment portion 32. The attachment portion 32 and the separation portion 33 are formed to be bent in an approximately L-shape from the upper end of the planar portion 31. Specifically, the separation portion 33 is formed to be bent toward the inner surface 31a of the planar portion 31 in such a form that the separation portion 33 is tilted upward from the upper end of the planar portion 31. Further, the attachment portion 32 is formed to extend approximately vertically from the edge of the separation portion 33.

As shown in FIG. 2, the attachment portion 32 is a portion that performs a role of fixing the friction plate 3 to the fixed side portion 11 of the fixed bracket 1, and welding, riveting, or the like can be used as means for fixing the attachment portion 32. In this embodiment, the projection-like attachment portion 32 of the friction plate 3 is brought into contact with and is attached, by welding, to the fixed side portion 11.

Due to the presence of the separation portion 33, a gap t is formed between the fixed side portion 11 of the fixed bracket 1 and the friction plate 3 attached to the fixed side portion 11 as shown in FIG. 1. The first friction washer 61 described later is inserted into the gap t. The dimensions of the gap t are determined by the size of the separation portion 33, and it is sufficient that the first friction washer 61 is smoothly inserted into the gap t.

The first friction washer 61 is made from metal and has a disk shape. A through-hole 61a is formed at the center of the first friction washer 61. Moreover, the first friction washer 61 has such a thickness dimension that the first friction washer 61 can be inserted into the gap t between the fixed side portions 11 and the planar portion 31 of the friction plate 3 (see FIG. 1C and FIG. 2).

A projecting portion 31d is formed on the inner surface 31a (the surface facing the fixed side portions 11) of the planar portion 31 of the friction plate 3. The projecting portion 31d performs a role of allowing the first friction washer 61 to be at an appropriate position and be inserted into the gap t between the fixed side portions 11 and the friction plate 3. That is, the projecting portion 31d allows the first friction washer 61 to be placed at an appropriate position just when the first friction washer 61 is dropped into the gap t between the fixed side portions 11 and the friction plate 3.

The appropriate position of the first friction washer 61 is such a position that the position of the through-hole 61a of the first friction washer 61 is identical to the positions of the long tilt-adjustment holes 11a of the fixed side portions 11 and the position of the long tilt-adjustment hole 31c of the planar portion 31. In particular, the through-hole 61a of the first friction washer 61 falls within the regions of the long tilt-adjustment holes 11a.

Subsequently, as shown in FIGS. 1B and 1C and FIG. 2, the pressing plate 4 is attached to the friction plate 3. The second friction washer 62 described later is clamped between the outer surface 31b of the friction plate 3 and the pressing plate 4. When the fastening tool 7 is fastened, the pressing plate 4 performs a role of increasing a frictional force together with the friction plate 3 and the first and second friction washers 61 and 62. The pressing plate 4 is formed of a metal plate, and a long adjustment hole 41a is formed in a planar portion 41. The planar portion 41 has approximately the same shape (specifically, an approximately rectangular shape) as the friction plate 3.

Moreover, the long tilt-adjustment hole 41a is formed in approximately the same shape as the long tilt-adjustment holes 11a formed in the fixed side portions 11 and the long tilt-adjustment hole 31c formed in the friction plate 3. The pressing plate 4 is a member that is independent from the fixed bracket 1 or the friction plate 3. Further, the pressing plate 4 is attached to the outer surface 31b of the friction plate 3 by the engagement means 5 described later with the second friction washer 62 clamped. The second friction washer 62 is made from metal and has the same shape as the first friction washer 61, and a through-hole 62a is formed at the center of the second friction washer 62.

The engagement means 5 is formed in each of the pressing plate 4 and the friction plate 3, and the pressing plate 4 is detachably attached to the outer surface 31b of the friction plate 3 by the engagement means 5 (see FIG. 2). Moreover, the pressing plate 4 is attached to the friction plate 3 so as to be immovable at least in the vertical direction and the circumferential direction by the engagement means 5 (see FIGS. 3B and 3C).

The engagement means 5 includes an engaging portion 51 and an engaged portion 52. One of the engaging portion 51 and the engaged portion 52 is formed on the pressing plate 4, and the other is formed on the friction plate 3. Specifically, the engaging portion 51 is formed in a projection shape, and the engaged portion 52 is formed in a notch shape. In the first embodiment of the present invention, the engaging portion 51 is formed on the pressing plate 4, and the engaged portion 52 is formed on the friction plate 3 (see FIG. 1 and FIG. 2).

The engaging portions 51 are formed at both ends in the front-rear direction of the planar portion 41 of the pressing plate 4. Both engaging portions 51 are formed in an approximately rectangular shape such as an oblong shape or a square shape, and actually, are formed from a metal plate to be integrated with the pressing plate 4 by press working or the like. The engaging portion 51 is a piece of a board that is bent to make a right angle (or make an approximate right angle) with the board surface of the planar portion 41 (see FIG. 2 and FIG. 3C).

Figure 3A:
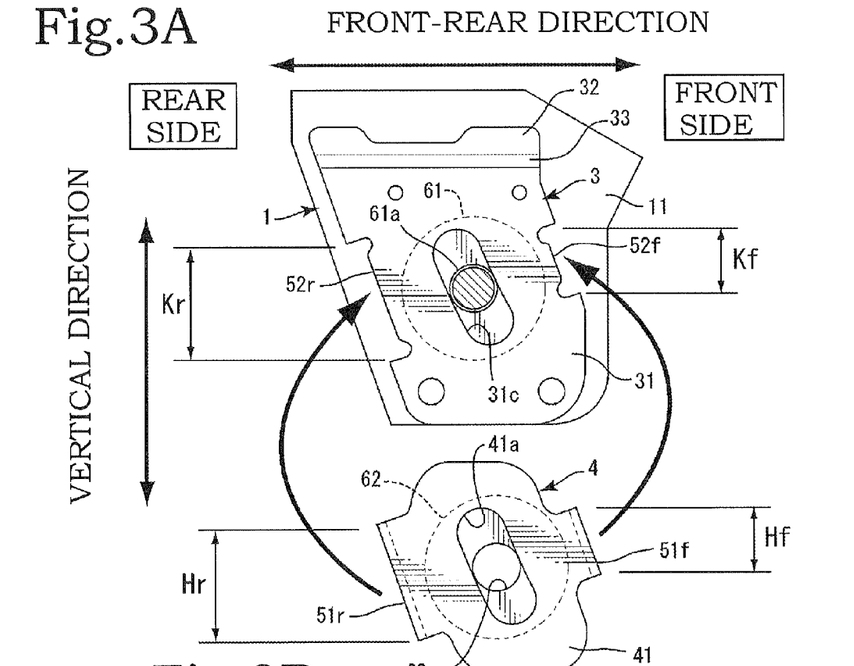
FIG. 3A is a side view showing a main part associated with attaching the pressing plate to the friction plate using engagement means.
Figures 3B, 3C:
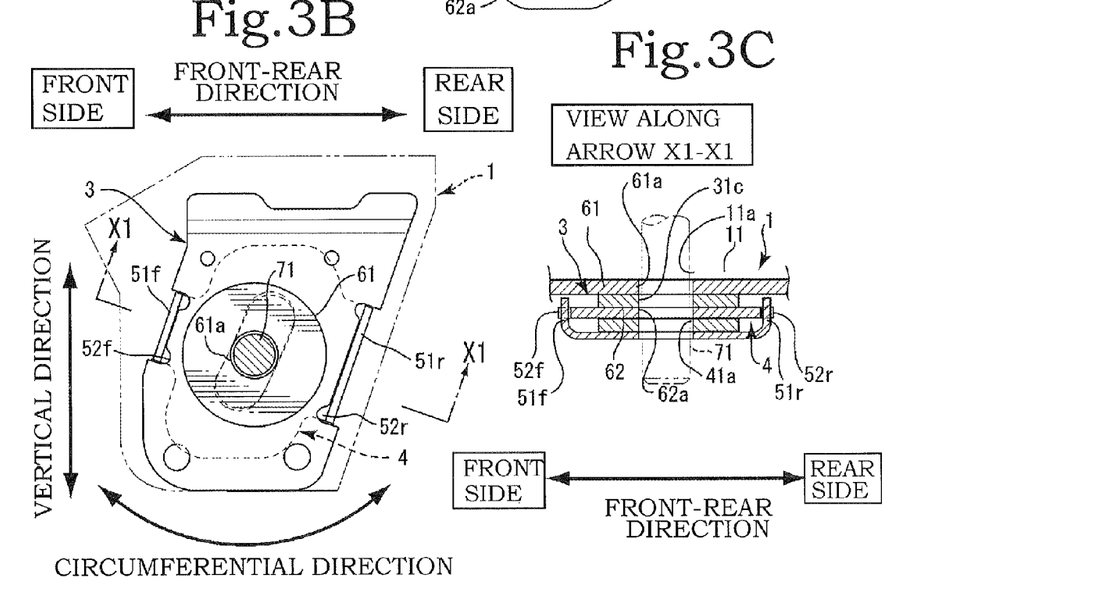
FIG. 3B is a side view showing a state where the pressing plate is attached to the friction plate when seen from an inner surface of the friction plate.
FIG. 3C is a cross-sectional view along arrows X1 and X1 in FIG. 3B.

Moreover, the engaged portions 52 are formed on both sides in the front-rear direction of the friction plate 3. As shown in FIGS. 2A and 3A, the engaged portions 52 are formed as notch portions having an approximately rectangular shape on both sides in the front-rear direction of the planar portion 31. A dimension H in the vertical direction of the engaging portion 51 has such a value that the engaging portion 51 is inserted into the engaged portion 52 that has a dimension K in the vertical direction. Moreover, when the pressing plate 4 is attached to the friction plate 3, both engaging portions 51 are inserted into and engaged with both engaged portions 52. As a result the pressing plate 4 is fixed and attached to the friction plate 3 so as to be immovable at least in the vertical direction and the circumferential direction.

Thus, even when a certain external load is applied to the steering wheel 91 after completion of tilt adjustment of the steering device, the pressing plate 4 is prevented from greatly deviating in the vertical direction in relation to the friction plate 3 and the fixed bracket 1. Actually, by the engagement between both engaging portions 51 in the front-rear direction of the pressing plate 4 and the engaged portions 52 in the front-rear direction of the friction plate 3, the pressing plate 4 is fixed in the front-rear direction as well as in the vertical direction.

Moreover, during assembling, the first friction washer 61 that is inserted into the gap t between the fixed side portion 11 and the friction plate 3 is prevented from greatly deviating in the front-rear direction and can be placed at an appropriate position. Here, a dimension corresponding to the amount of protrusion of the engaging portion 51 is referred to as a width dimension W. In the first embodiment, a dimension W in the width direction of the engaging portion 51 that protrudes from the pressing plate 4 is set to such a length that the engaging portion 51 does not interfere with the fixed side portion 11 when the pressing plate 4 is attached to the friction plate 3 with the second friction washer 62 clamped.

Figure 5A:
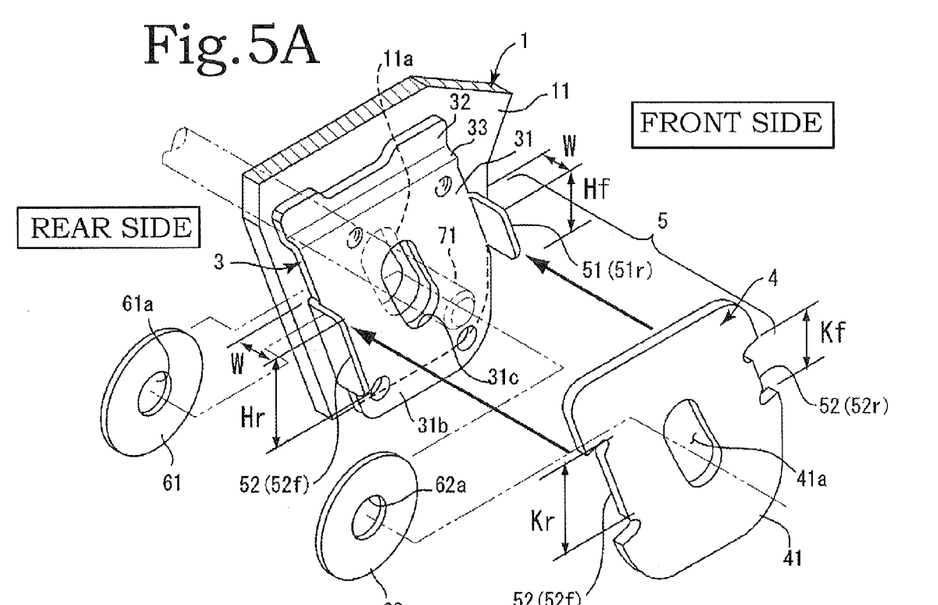
FIG. 5A is a perspective view showing a state where a friction plate, a pressing plate, a first friction washer, and a second friction washer according to a second embodiment of the present invention are separated.

As in a second embodiment of the present invention shown in FIG. 5, the engaging portions 51 may be formed on both sides in the front-rear direction of the friction plate 3, and the engaged portions 52 may be formed on both sides in the front-rear direction of the pressing plate 4. Specifically, the engaging portions 51 are formed at both ends in the front-rear direction of the planar portion 31 of the friction plate 3 so as to extend at the right angle toward the outer side from the outer surface 31b. Moreover, the engaged portions 52 having a notch shape are formed on both sides in the front-rear direction of the pressing plate 4.

In the second embodiment, the projection-shaped engaging portion 51 formed on the friction plate 3 is engaged with the notch-shaped engaged portion 52 formed in the pressing plate 4. In this case, the projection-shaped engaging portion 51 formed on the friction plate 3 is formed so as to protrude toward the engaged portion 52 of the pressing plate 4.

Thus, the engaging portion 51 does not interfere with the fixed side portion 11 of the fixed bracket 1 to which the friction plate 3 is attached. Therefore, the engaging portion 51 that extends from the outer surface 31b of the friction plate 3 can have a relatively large width dimension W (see FIG. 5B).

Figure 5B:
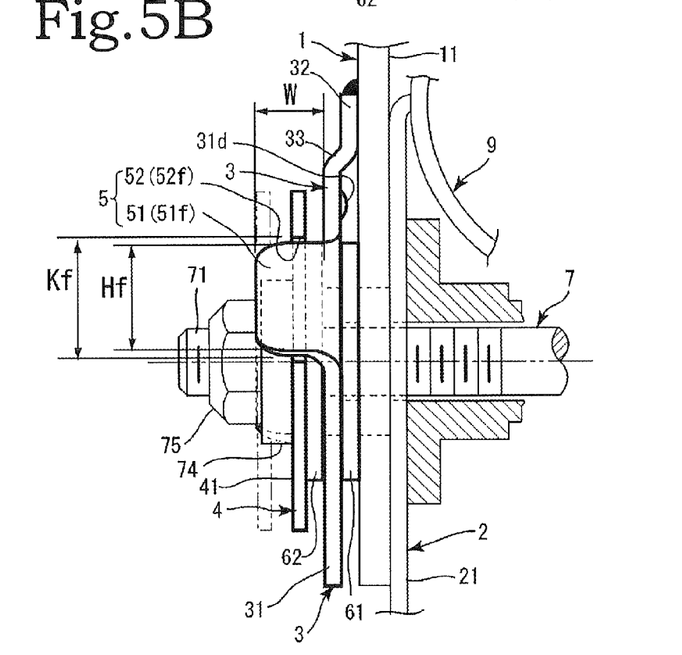
FIG. 5B is a partially cross-sectional front view of a main part showing a state where a pressing plate is engaged with and fixed to the friction plate according to the second embodiment of the present invention.

By increasing the width dimension W of the engaging portion 51, the pressing plate 4 and the friction plate 3 can increase the mutual separation distance between the pressing plate 4 and the friction plate 3 while maintaining the engagement state between the engaging portion 51 and the engaged portion 52 of the engagement means 5. Thus, for example, when the steering device of the present invention is assembled and is moved for the next process, the friction plate 3 and the pressing plate 4 can maintain the engagement state realized by the engagement means 5.

In the first and second embodiments, the engaging portions 51 of the engagement means 5 may be configured such that the engaging portion 51 formed on the front side of the friction plate 3 or the pressing plate 4 has a vertical dimension H that is different from that of the engaging portion 51 formed on the rear side, and both engaged portions 52 in the front-rear direction have sizes that correspond to the sizes of the engaging portion 51 on the front side and the engaging portion 51 on the rear side. That is, the engaging portion 51 on the front side in the front-rear direction is referred to as a front-side engaging portion 51f, and the engaging portion 51 on the rear side is referred to as a rear-side engaging portion 51r (see FIG. 2 and FIG. 3A).

Moreover, a vertical dimension of the front-side engaging portion 51f is referred to as Hf, and a vertical dimension of the rear-side engaging portion 51r is referred to as Hr. The front-side engaging portion 51f has a smaller height dimension than the rear-side engaging portion 51r and a relation of Hf<Hr is satisfied.

Further, both engaged portions 52 in the front-rear direction are formed to have sizes corresponding to the sizes of the front-side engaging portion 51f and the rear-side engaging portion 51r. That is, the engaged portion 52 on the front side in the front-rear direction is referred to as a front-side engaged portion 52f, and the engaged portion 52 on the rear side is referred to as a rear-side engaged portion 52r. A vertical dimension of the front-side engaged portion 52f is referred to as Kf, and a vertical dimension of the rear-side engaged portion 52r is referred to as Kr. The vertical dimension Hf of the front-side engaging portion 51f is approximately the same as the vertical dimension Kf of the front-side engaged portion 52f.

Moreover, the vertical dimension Hr of the rear-side engaging portion 51r is approximately the same as the vertical dimension Kr of the rear-side engaged portion 52r. However, the vertical dimension of the front-side engaged portion 52f is slightly larger than that of the front-side engaging portion 51f so that the front-side engaging portion 51f is inserted into the front-side engaged portion 52f, and the rear-side engaging portion 51r is inserted into the rear-side engaged portion 52r. Similarly, the vertical dimension of the rear-side engaged portion 52r is also slightly larger than that of the rear-side engaging portion 51r. Moreover, the slight difference in the vertical dimension includes such a range that both dimensions are approximately the same (see FIG. 2 and FIG. 3A).

The vertical dimension of the front-side engaged portion 52f is smaller than the rear-side engaged portion 52r, and a relation of Kf<Kr is satisfied.

Due to this, the front-side engaging portion 51f having the small vertical dimension Hf can be engaged only with the front-side engaged portion 52f having approximately the same vertical dimension Kf. The rear-side engaging portion 51r having the large vertical dimension Hr can be engaged only with the rear-side engaged portion 52r having approximately the same vertical dimension Kr. As a result, the pressing plate 4 and the friction plate 3 are not attached unless the front-rear direction of the pressing plate 4 is identical to the front-rear direction of the friction plate 3. Thus, the pressing plate 4 can be correctly attached to the friction plate 3 without any error in the front-rear direction, and errors in the assembling operation can be prevented (see FIG. 2 and FIGS. 3A and 3B).

Next, assembling of the steering device according to the present invention will be described. Both movable side portions 21 of the movable bracket 2 are disposed so as to be clamped between both fixed side portions 11 of the fixed bracket 1. The lock bolt 71 of the fastening tool 7 passes through the long tilt-adjustment hole 11a of the fixed bracket 1, the long telescopic-adjustment hole 21a of the movable bracket 2, the long tilt-adjustment hole 31c of the friction plate 3, the through-hole 61a of the first friction washer 61, the long tilt-adjustment hole 62a of the second friction washer 62, and the long tilt-adjustment hole 41a of the pressing plate 4, and is attached so that the lock bolt 71 is freely locked for attachment.

Figure 4A:
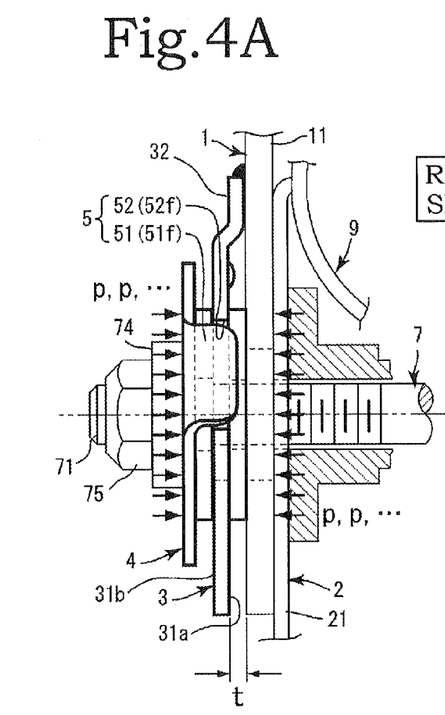
FIG. 4A is a partially cross-sectional front view showing a main part showing a state where the fixed side portion of the fixed bracket are tightly fastened and fixed by the friction plate, the pressing plate, the first friction washer, the second friction washer.
Figure 4B:
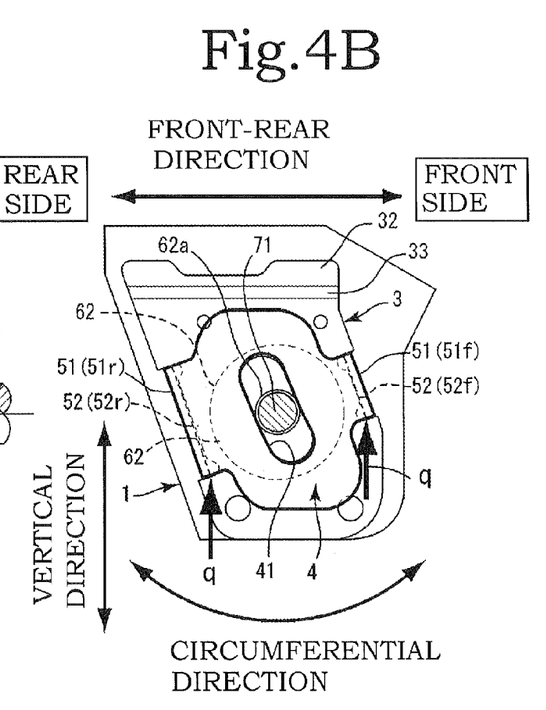
FIG. 4B is a partially cross-sectional side view showing a state where the pressing plate is fixed to the friction plate in a vertical direction and a circumferential direction by the engagement means.
Figure 4C:
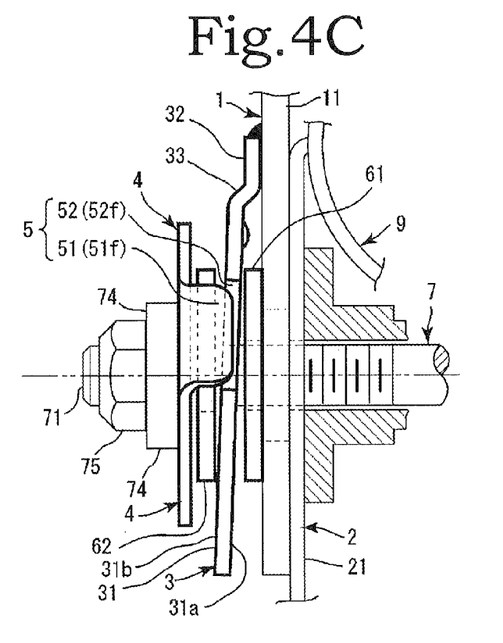
FIG. 4C is a partially cross-sectional front view of a main part showing a state where a fastening tool is loosened so that the pressing plate is separated from the fixed side portion of the fixed bracket and the friction plate.

The operating lever portion 72 and the cam member 73 are provided to the fastening tool 7 between a head portion of the lock bolt 71 and the fixed side portion 11 on one side, and a thrust washer 74 and a lock nut 75 are attached to the fixed side portion 11 on the other side (see FIG. 4). When the operating lever portion 72 is rotated to be fastened, the friction plate 3, the first and second friction washers 61 and 62, and the pressing plate 4 receive fastening (locking) pressure p due to the axial pressure of the lock bolt 71.

Due to the pressure p, the first friction washer 61 is clamped between the fixed side portion 11 of the fixed bracket 1 and the friction plate 3, and the second friction washer 62 is clamped between the friction plate 3 and the pressing plate 4. Moreover, when the lock bolt 71 is fastened by the operating lever portion 72 of the fastening tool 7, the pressure-contact frictional force caused by the axial force of the lock bolt 71 increases, and the force of retaining the position of the steering column can be increased.

The pressing plate 4 is fixed to the friction plate 3 so as to be movable in the axial direction but is not movable at least in the vertical direction and the circumferential direction due to the engagement means 5. Moreover, even when a load that exceeds the position retaining force due to the fastening force of the fastening tool 7 is applied to the steering column, the pressing plate 4 is engaged with the friction plate 3, and the projection-shaped engaging portion 51 of the engagement means 5 is engaged with the notch-shaped engaged portion 52. Thus, a vertical drag force q acts between the engaging portion 51 and the engaged portion 52 (see FIG. 4B).

Due to the engagement state created by the engaging portion 51 and the engaged portion 52 of the engagement means 5, the pressing plate 4 is fixed in the vertical direction similarly to the friction plate 3, the frictional force of the pressing plate 4 and the first and second friction washers 61 and 62 is increased. Thus, the steering column is prevented from deviating in the vertical direction. Further, when the fastening tool 7 is locked, the second friction washer 62 is clamped by the friction plate 3 and the pressing plate 4. When the fastening tool 7 is unlocked, the pressing plate 4 is moved in the axial direction of the lock bolt 71 of the fastening tool 7 in relation to the friction plate 3. Thus, a gap is formed between the pressing plate 4 and the friction plate 3. Due to this, tilt adjustment can be performed smoothly (see FIG. 4C).

Moreover, the pressing plate 4 is a member that is independent from the friction plate 3, and in a state where the fastening tool 7 is unlocked, the pressure between the fixed side portion 11, the friction plate 3, the pressing plate 4, and the first and second friction washers 61 and 62 disappears. Furthermore, since the first and second friction washers 61 and 62 and the pressing plate 4 are supported by the lock bolt 71 only, the movable bracket 2 can be smoothly moved in the axial direction in relation to the fixed bracket 1 during telescopic adjustment. Thus, users can perform the telescopic adjustment smoothly.

What is claimed is:

1. A steering device comprising:
    a fixed bracket that includes fixed side portions on both sides in a width direction of the fixed bracket;
    a movable bracket disposed between the fixed side portions;
    a friction plate attached to face, with an appropriate gap, at least one of both fixed side portions of the fixed bracket;
    a first friction washer inserted between the fixed side portion and the friction plate;
    a pressing plate attached to an outer surface of the friction plate;
    engagement means for detachably attaching the pressing plate to the friction plate so as to be immovable at least in a vertical direction;
    a second friction washer clamped between the pressing plate and the friction plate; and
    a fastening tool,
    wherein the fixed bracket, the friction plate, the first friction washer, the second friction washer, and the pressing plate are connected by penetrating therethrough a lock bolt of the fastening tool so as to be freely locked and unlocked,
    and the engagement means includes a projection-shaped engaging portion and a notch-shaped engaged portion to which the engaging portion is inserted.

2. The steering device according to claim 1, wherein the engaging portion is formed on both sides in a front-rear direction of the pressing plate, and the engaged portion is formed on both sides in the front-rear direction of the friction plate.

3. The steering device according to claim 1, wherein the engaging portion is formed on both sides in a front-rear direction of the friction plate, and the engaged portion is formed on both sides in the front-rear direction of the pressing plate.

4. The steering device according to claim 1, wherein the engaging portion on the front side has a vertical dimension that is different from that of the engaging portion on the rear side, and the engaged portions have sizes that correspond to those of the engaging portions on the front and rear sides.

5. The steering device according to claim 2, wherein the engaging portion on the front side has a vertical dimension that is different from that of the engaging portion on the rear side, and the engaged portions have sizes that correspond to those of the engaging portions on the front and rear sides.

6. The steering device according to claim 3, wherein the engaging portion on the front side has a vertical dimension that is different from that of the engaging portion on the rear side, and the engaged portions have sizes that correspond to those of the engaging portions on the front and rear sides.

* * * * *